United States Patent
Nishimura et al.

(10) Patent No.: US 7,293,172 B2
(45) Date of Patent: Nov. 6, 2007

(54) SCRAMBLING OF IMAGE BY RANDOMIZING PIXEL VALUES

(75) Inventors: Takayuki Nishimura, Tottori (JP); Yasuyuki Nomizu, Kanagawa (JP); Hiroyuki Sakuyama, Tokyo (JP); Junichi Hara, Kanagawa (JP); Nekka Matsuura, Kanagawa (JP); Takanori Yano, Kanagawa (JP); Taku Kodama, Kanagawa (JP); Toshio Miyazawa, Kanagawa (JP); Yasuyuki Shinkai, Kanagawa (JP)

(73) Assignee: Ricoh Copmany, Ltd., Tokyo (JP)

( * ) Notice: Subject to any disclaimer, the term of this patent is extended or adjusted under 35 U.S.C. 154(b) by 736 days.

(21) Appl. No.: 10/763,845

(22) Filed: Jan. 22, 2004

(65) Prior Publication Data
US 2004/0252834 A1     Dec. 16, 2004

(30) Foreign Application Priority Data

Jan. 22, 2003 (JP) ............... 2003-013591
Jan. 20, 2004 (JP) ............... 2004-012239

(51) Int. Cl.
*G06F 9/00* (2006.01)
(52) U.S. Cl. ...................... 713/161; 713/168
(58) Field of Classification Search ............... 713/161, 713/168
See application file for complete search history.

(56) References Cited

FOREIGN PATENT DOCUMENTS

| JP | 2000-115581 | 4/2000 |
|----|-------------|--------|
| JP | 2001-218184 | 8/2001 |

*Primary Examiner*—Thomas R. Peeso
(74) *Attorney, Agent, or Firm*—Blakely, Sokoloff, Taylor & Zafman LLP

(57) ABSTRACT

An apparatus for coding an image while scrambling the image by randomizing pixel values includes a scrambling unit which scrambles an image by utilizing an encryption function to compute a displacement of a pixel value to be randomized in response to a displacement of a previously randomized pixel value.

32 Claims, 13 Drawing Sheets

DECOMPOSITION_LEVEL_0

DECOMPOSITION_LEVEL_1

DECOMPOSITION_LEVEL_2

DECOMPOSITION_LEVEL_3

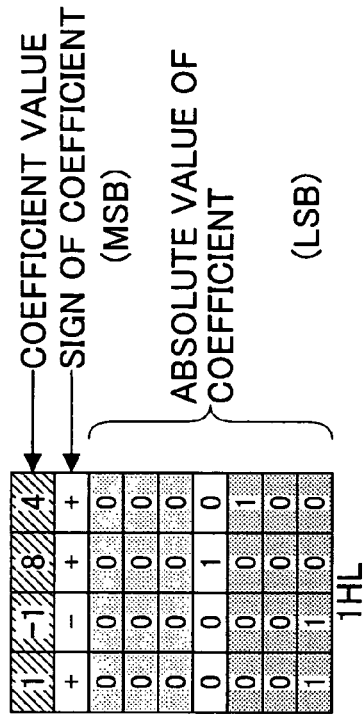

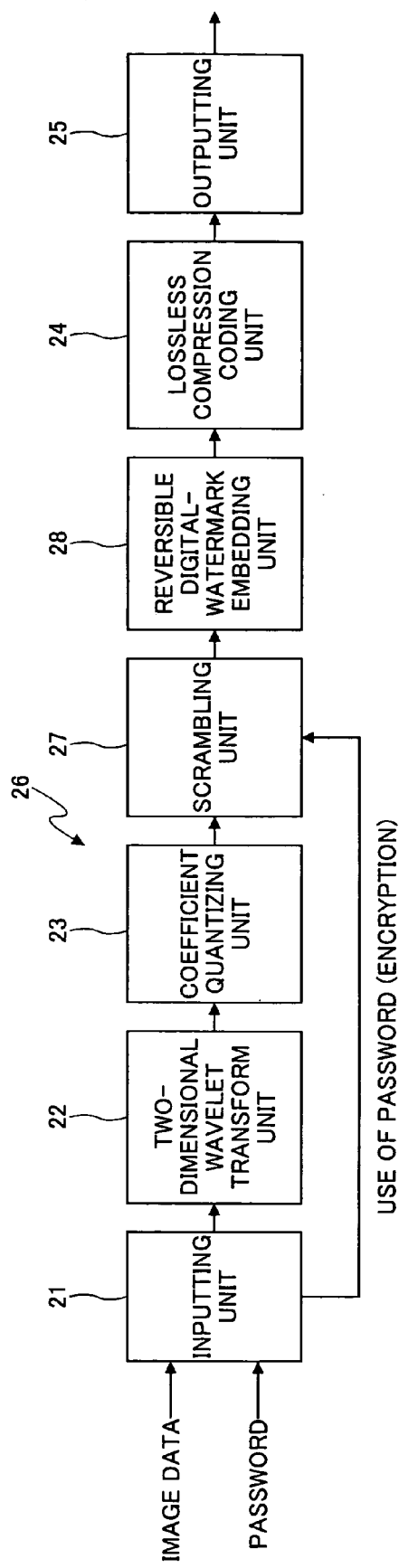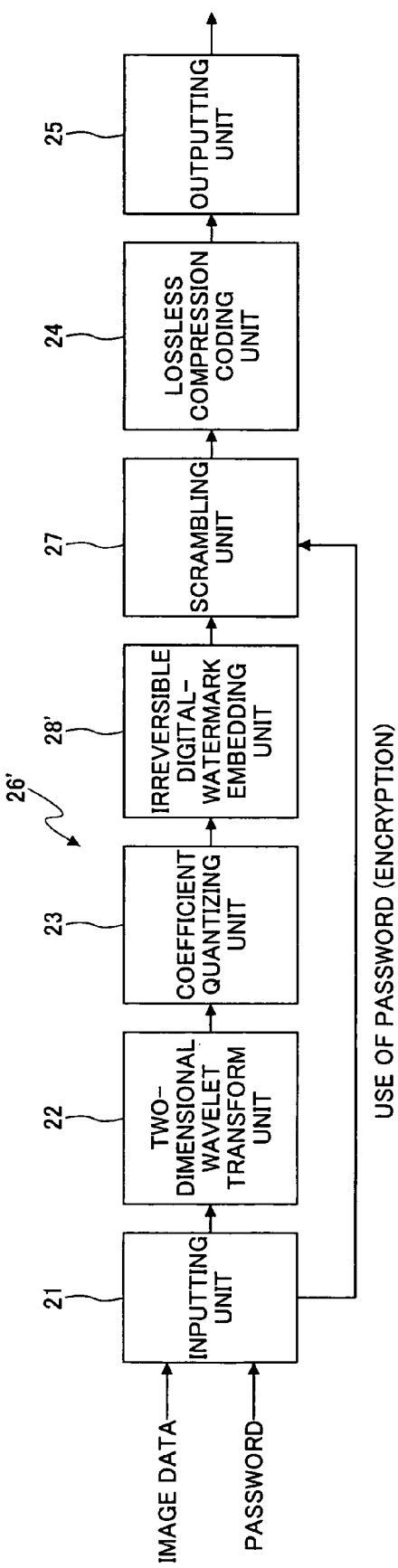

FIG.10

| A | k−1 | k | k+1 | k+2 |
|---|---|---|---|---|
| B | 11 | 19 | 23 | 20 |
| C | (+2)*2 | (−3)*2 | (−1)*2 | (+1)*2 |

FIG.11
[ORIGINAL IMAGE]
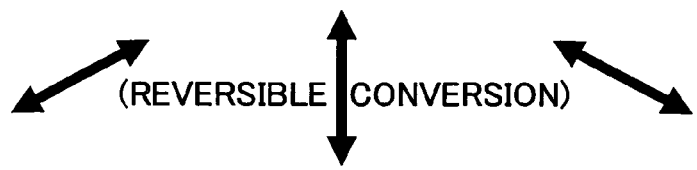
(REVERSIBLE CONVERSION)
      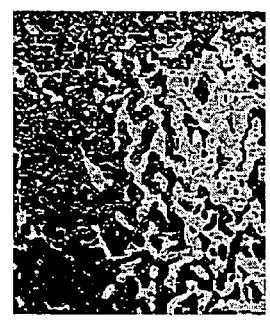
[LOW SCRAMBLING]   [MEDIUM SCRAMBLING]   [HIGH SCRAMBLING]

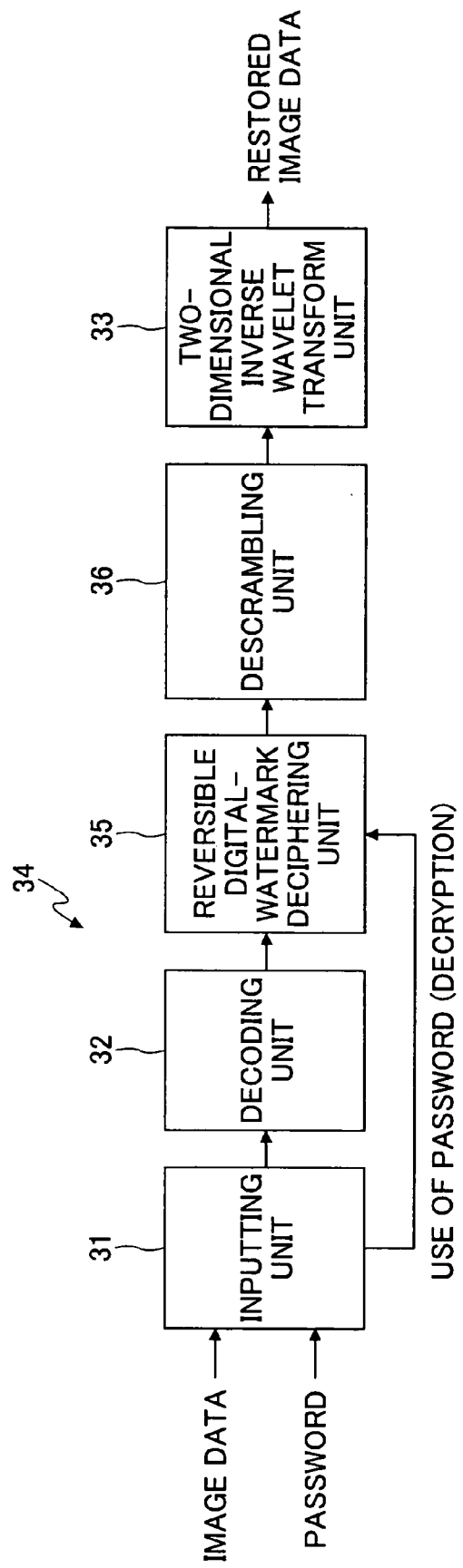

SCRAMBLING OF IMAGE BY RANDOMIZING PIXEL VALUES

The present application claims priority to the corresponding Japanese Application Nos. 2003-013591, filed Jan. 22, 2003 and 2004-012239, filed Jan. 20, 2004, the entire contents of which are hereby incorporated by reference.

FIELD OF THE INVENTION

The present invention relates to an image coding apparatus, a code decoding apparatus, an image coding method, a code decoding method, and programs and recording media for performing such methods.

DESCRIPTION OF THE RELATED ART

In recent years, digital data communication through the Internet has been widely performed as a result of dissemination and development of the Internet, personal computers, and the like. At a transmission end, such digital data is coded prior to transmission. For example, a transmitting party (delivering party) such as a provider provides services by transmitting coded image data to a number of unspecified users. As one of these services, data such as product information may be delivered to users through the Internet in respect of mail-order sales. In this case, users who have paid fees to the provider in advance are qualified to decode and see received code data according to the amount of fees that they paid.

When services are rendered by delivering coded data to a number of unspecified users, only the qualified users should be able to decode the coded data. The general public may not be able to see the coded image data despite the fact that they may become qualified users in the future by signing up with the provider. In such a case, there is not much prospect for a user increase because of a failure to lure interest.

In consideration of this, a scrambling system is widely used. In this system, coded data is delivered as scrambled coded data, and qualified users are given software for descrambling, so that the qualified users can see normal, originally intended images by scrambling images at the time of decoding. Because of the scrambling of data, unqualified users have difficulty seeing and making out the originally intended images, but may become interested in seeing the originally intended images. Such a promotion effect may result in an increase in the number of qualified users.

There are a number of schemes available for this scrambling system. Those schemes include a system that achieves scrambling by rearranging a data sequence such as through line rotation, line permutation, or the like (e.g., Japanese Patent Application Publication No. 2001-218184), a system that achieves scrambling by randomizing image data (random encryption), and other systems such as the rotation of color space axes (e.g., Japanese Patent Application Publication No. 2000-115581).

The related-art scrambling systems as described above determine a scrambling displacement (Δ displacement) by obtaining information regarding scrambling from external sources by form of index information or the amount of positional correction (parameters), or by selecting a particular value such as an average value or a direct-current value, thus failing to provide displacements of higher latitude in image data.

Moreover, when image data is to be scrambled, there may be a case in which a desired effect of scrambling is to make images highly indiscernible, or may be a case in which a desired effect of scrambling is to avoid making too many indiscernible images. Since the related-art scrambling systems offer only a fixed degree of scrambling effect, providers have difficulty providing scrambled images whose image quality is reduced to a proper level on an image-data-by-image-data basis.

Accordingly, there is a need for a scheme that provides a displacement of great latitude without relying on external inputs when scrambling images by randomizing pixels of the images.

Moreover, there is a need for a scheme that provides for the degradation of scrambled image quality to be freely adjustable.

SUMMARY OF THE INVENTION

The scrambling of an image by randomizing pixel values is described. In one embodiment, an apparatus for coding an image while scrambling the image by randomizing pixel values comprises a scrambling unit that scrambles an image by utilizing an encryption function to compute a displacement of a pixel value to be randomized in response to a displacement of a previously randomized pixel value.

BRIEF DESCRIPTION OF THE DRAWINGS

FIGS. 5A through 5E are illustrative drawings for illustrating a procedure for ordering bitplanes;

FIGS. 9A and 9B are block diagrams showing a simplified version of a compression coding unit of the JPEG2000 algorithm that is performed by the server computer;

FIG. 10 is a table chart showing an example in which specific numerical values are used;

FIG. 11 is a drawing showing different degrees of scrambling that are effected by changes in the factor of degree;

FIG. 12 is a block diagram showing a simplified version of a decoding unit of the JPEG2000 algorithm that is performed by the personal computer.

DESCRIPTION OF THE PREFERRED EMBODIMENTS

Figure 1:
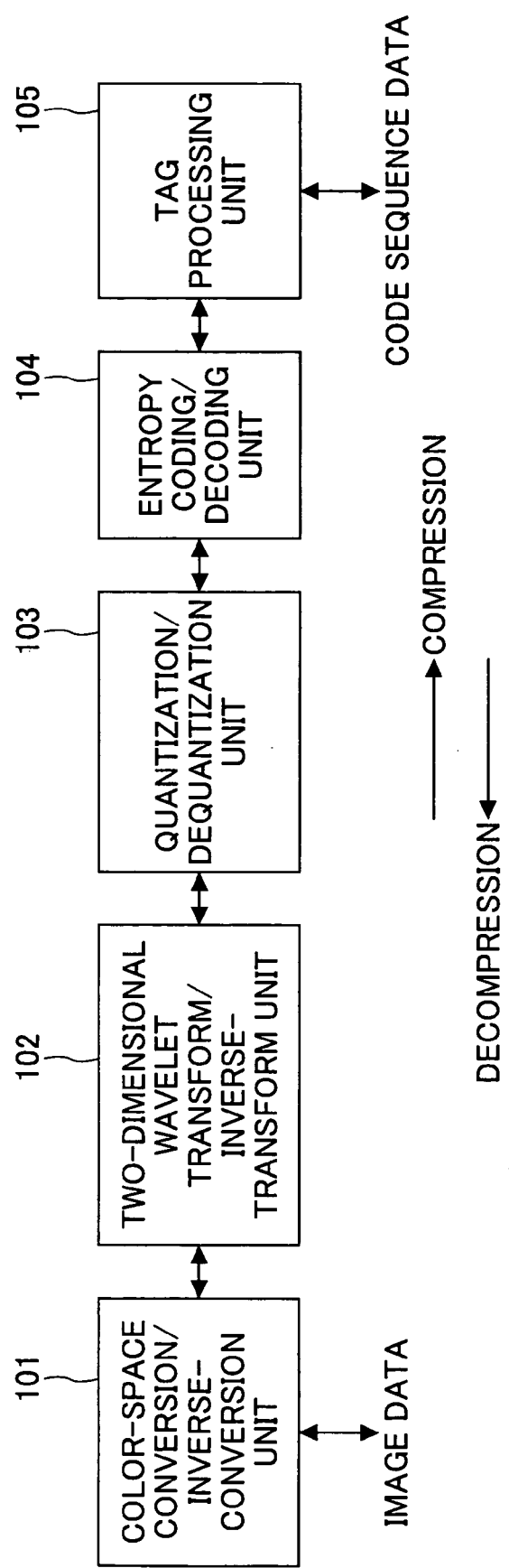
FIG. 1 is a functional block diagram of a system that performs a hierarchical coding algorithm that is a foundation of the JPEG2000 system.

One or more embodiments of the present invention provide a scheme that substantially obviates one or more problems caused by the limitations and disadvantages of the related art.

Features and advantages of the present invention will be presented in the description that follows, and in part will become apparent from the description and the accompanying drawings, or may be learned by practice of the invention according to the teachings provided in the description. Embodiments as well as other features and advantages of the present invention will be realized and attained by a scheme particularly pointed out in the specification in such full, clear, concise, and exact terms as to enable a person having ordinary skill in the art to practice the invention.

To achieve these and other advantages in accordance with the purpose of the invention, an embodiment of the invention includes an apparatus for coding an image while scrambling the image by randomizing pixel values, including a scrambling unit that scrambles an image by utilizing an encryption function to compute a displacement of a pixel value to be randomized in response to a displacement of a previously randomized pixel value.

In one embodiment, when the pixel values are successively randomized, the displacement of the pixel value to be randomized is determined based on the displacement of the previously randomized pixel value. This achieves a displacement of higher latitude by utilizing randomness that is present in the image data.

According to another embodiment of the invention, the displacement of a pixel value is increased/decreased by increasing/decreasing the number of effective digits of a value of the encryption function, or by increasing/decreasing a factor of degree that is to be multiplied by a displacement basis.

According to another embodiment of the invention, the apparatus as described above further includes a compression coding unit that generates a code sequence by performing compression coding with respect to the image, and which includes a plurality of functional stages, wherein the scrambling unit is provided at a predetermined stage along a series of the functional stages, each stage of the functional stages following the predetermined stage being reversible.

In one embodiment, the scrambling unit is provided at the predetermined stage along the plurality of stages, and all the stages following the predetermined stage where the scrambling unit is situated are reversible. A compression coding unit may perform compression coding according to JPEG2000. If provided between a coefficient quantizing stage and a reversible compression coding stage, the scrambling unit randomizes a quantized discrete wavelet transform coefficient as a pixel value. If provided prior to the discrete wavelet transform stage of JPEG2000, the scrambling unit randomizes a pixel value before the discrete wavelet transform is performed.

According to another embodiment of the invention, an apparatus for decoding codes includes a decoding unit that decodes scrambled code data into an image, and includes a plurality of functional stages, the scrambled code data being scrambled by the apparatus as described above, and a descrambling unit, provided at a predetermined stage along a series of the functional stages, to descramble the scrambled code data. In one embodiment, the descrambling unit in the decoding apparatus is situated at a position corresponding to the position of the scrambling unit situated in the coding apparatus.

According to one embodiment of the invention, pixel values of an image are randomized in such a manner to provide a displacement of high latitude without depending on an input from an external source. Further, in one embodiment, provision is made to adjust a displacement of a pixel value by increasing/decreasing the number of effective digits of a value of the encryption function or by increasing/decreasing a factor of degree. This makes it possible to freely adjust the degree of image degradation that is effected by scrambling.

Other embodiments and further features of the present invention will be apparent form the following detailed description when read in conjunction with the accompanying drawings.

In the following, embodiments of the present invention will be described with reference to the accompanying drawings.

In the following, the outline of JPEG2000 algorithm, which forms a basis for embodiments of the invention, will be described first.

FIG. 1 is a functional block diagram of a system that performs a hierarchical coding algorithm that is a foundation of the JPEG2000 system. This system is comprised of functional blocks, including a color-space conversion/inverse-conversion unit 101, a two-dimensional wavelet transform/inverse-transform unit 102, a quantization/dequantization unit 103, an entropy coding/decoding unit 104, and a tag processing unit 105.

The point at which this system most differs from the conventional JPEG algorithm is the method of transform. While the JPEG algorithm uses the discrete cosine transform (DCT), the hierarchical coding algorithm of this system employs discrete wavelet transform (DWT), which is performed by the two-dimensional wavelet transform/inverse-transform unit 102. DWT has an advantage over DCT in that image quality is high when compression rates are high. This is one of the reasons why DWT was adopted by JPEG2000, which is a successor algorithm to JPEG.

Another significant difference is that, in the hierarchical coding algorithm, the system is provided with an additional functional block of the tag processing unit 105 for the purpose of performing code generation at the last stage of the system. The tag processing unit 105 generates compressed data as code sequence data at the time of image compression, and interprets code sequence data necessary for decompression at the time of decompression.

JPEG2000 is configured to provide various convenient functions through code sequence data. For example, the compression and decompression process of a still image can freely be suspended at any one of decomposition levels, which correspond to the octave division of the block-based DWT (see FIG. 3, which will be later described).

At the input/output of an original image, the color-space conversion/inverse-conversion unit 101 may often be coupled. For example, the RGB color system comprised of R(red), G(green), and B(blue) components that are primary colors or the YMC color system comprised of Y(yellow), M(magenta), and C(cyan) components that form a complement color system is converted into or inverse-converted from the YcbCr or YUV color system.

In the following, the JPEG2000 algorithm will be described.

Figure 2:
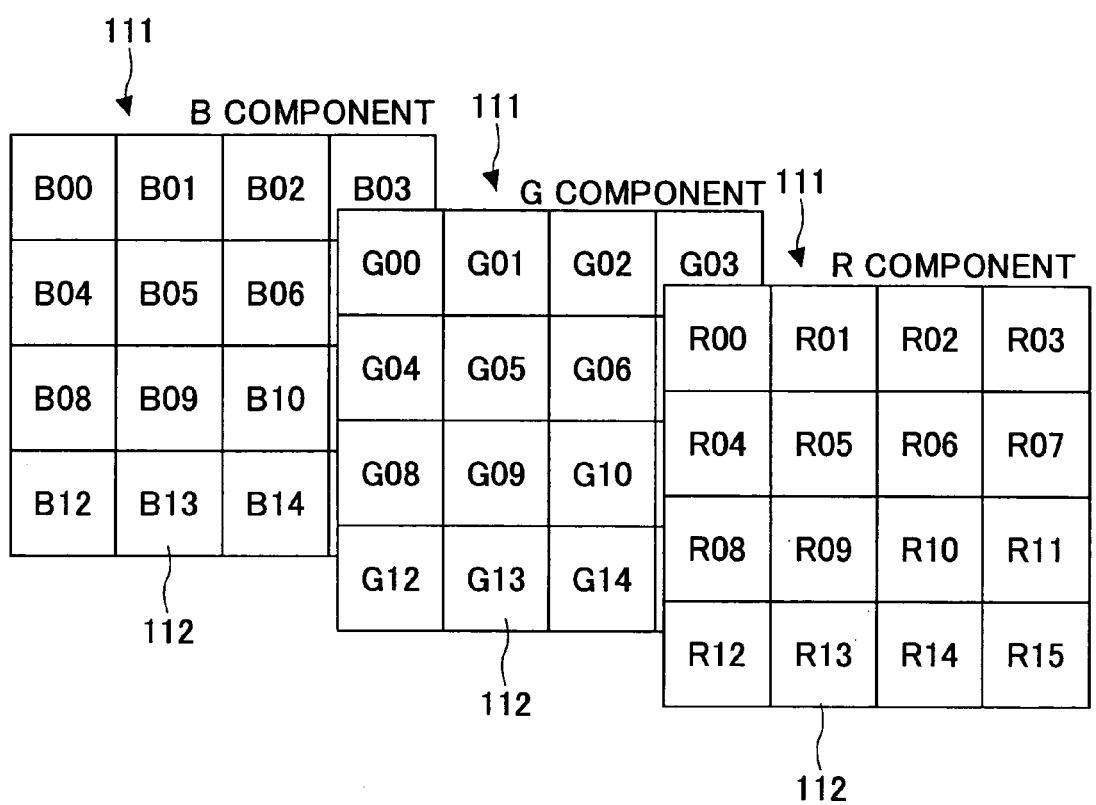
FIG. 2 is an illustrative drawing showing a color image that is divided into rectangular areas with respect to each component.
Figure 3A:
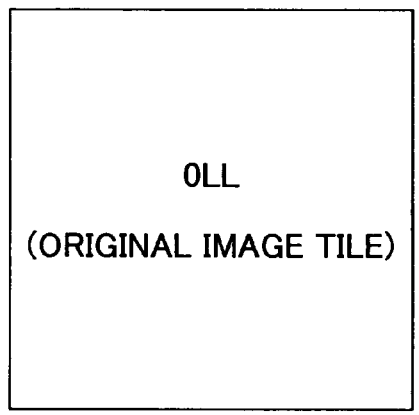
FIGS. 3A through 3D are illustrative drawings showing sub-bands in each decomposition level in a case where the number of decomposition levels is 3.
Figure 3B:
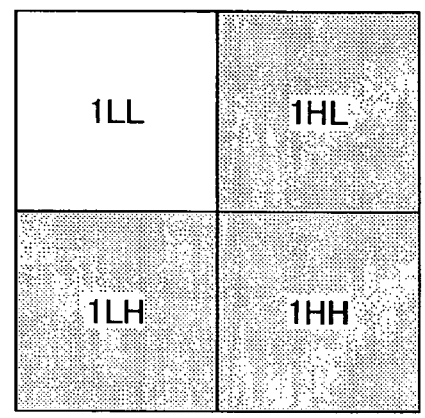
Figure 3C:
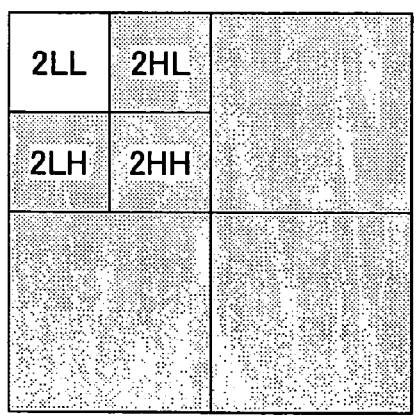
Figure 3D:
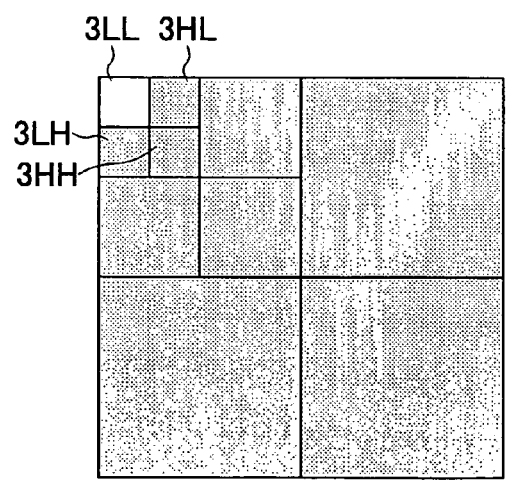

In general, a color image is divided into rectangular areas with respect to each component 111 of an original image, as shown in FIG. 2 (which is directed to the RGB primary color system). These rectangular areas are generally referred to as blocks or tiles. Since they are generally referred to as tiles in JPEG2000, these divided rectangular areas are hereinafter called tiles. In the example shown in FIG. 2, each component 111 is divided into 16 rectangular tiles 112 (4×4 in rows and columns).

The individual tiles 112 (i.e., R00, R01, . . . , R15/G00, G01, . . . , G15/B00, B01, . . . , B15 in the example of FIG.

2) serve as a basic unit when the compression/decompression process is performed with respect to image data. In this manner, the compression/decompression of image data is carried out separately for each component on a tile-by-tile basis.

In the coding of image data, data of each tile 112 of each component 111 is input into the color-space conversion/inverse-conversion unit 101 shown in FIG. 1. After color space conversion is performed, the two-dimensional wavelet transform/inverse-transform unit 102 carries out 2-dimensional wavelet transform (forward conversion) to divide the space into frequency bands.

FIGS. 3A through 3D are drawings showing sub-bands in each decomposition level in the case where the number of the decomposition levels is 3. An original tile image (0LL) (decomposition level 0) that is obtained by the tile division of an original image is subjected to the 2-dimensional wavelet transform, thereby separating sub-bands (1LL, 1HL, 1LH, 1HH) shown at the decomposition level 1. Following this, the low frequency components 1LL at this hierarchical level is subjected to the 2-dimensional wavelet transform, thereby separating sub-bands (2LL, 2HL, 2LH, 2HH) shown at the decomposition level 2. Subsequently, the 2-dimensional wavelet transform is again performed with respect to the low frequency components 2LL, thereby separating sub-bands (3LL, 3HL, 3LH, 3HH) shown at the decomposition level 3. In FIGS. 3A through 3D, the sub bands that are to be coded at each decomposition level are illustrated in the gray halftone. When the decomposition level is 3, for example, the sub bands (3HL, 3LH, 3HH, 2HL, 2LH, 2HH, 1HL, 1LH, 1HH) shown in the gray halftone are subjected to a coding process, and the sub-band 3LL is excluded from the coding process.

In predetermined order for coding, bits to be coded are selected, and the quantization/dequantization unit 103 shown in FIG. 1 generates contexts from surrounding bits that are located around the selected bit.

Figure 4:
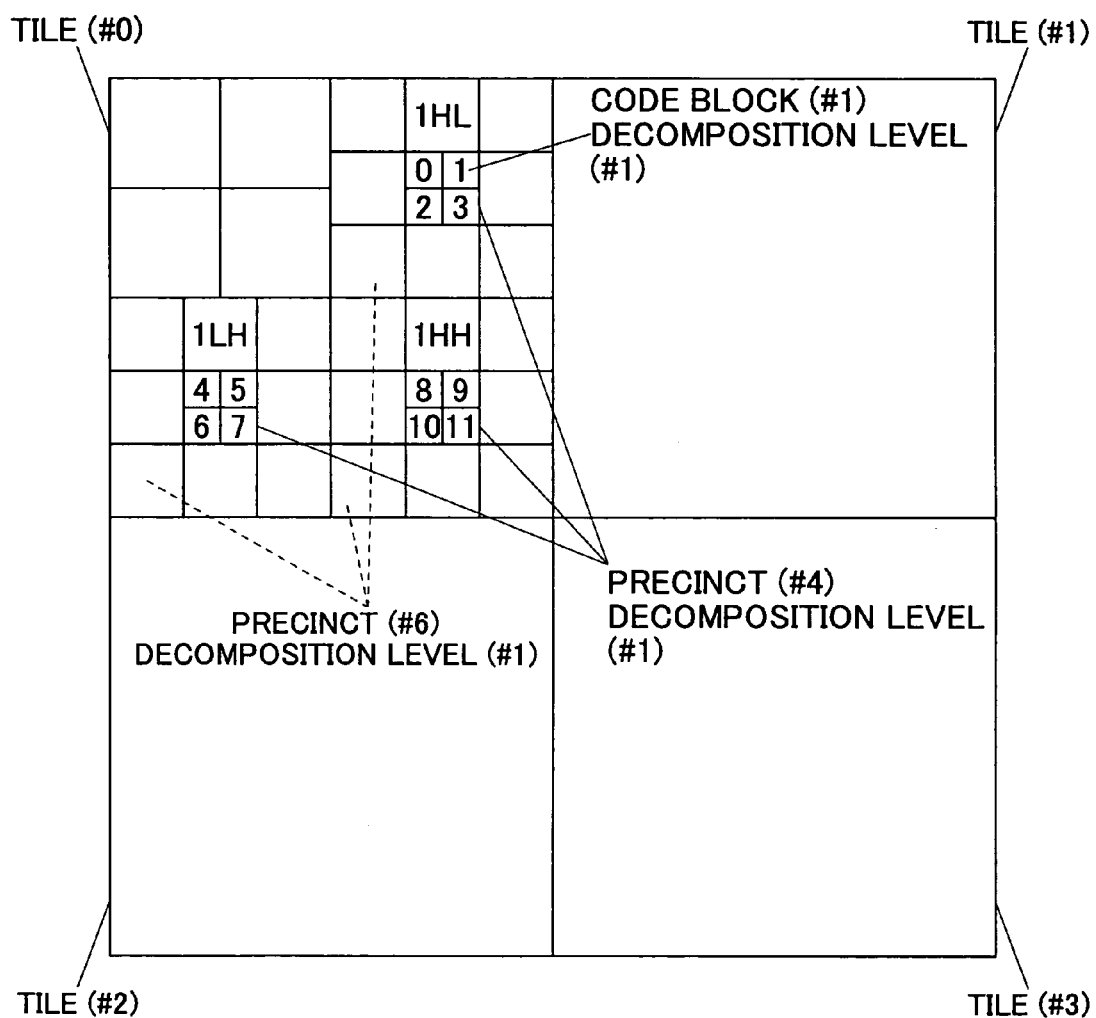
FIG. 4 is an illustrative drawing for illustrating precincts.

Wavelet coefficients for which quantization is finished are then divided into non-overlapping rectangles separately for each sub-band. These rectangles are referred to as "precinct." This provision is made in order to make efficient use of memories at the time of implementation. As shown in FIG. 4, one precinct is comprised of three rectangular areas that have matching positional arrangement. Each precinct is divided into code blocks, which are non-overlapping rectangular areas. The code block serves as a basic unit for performing entropy coding.

Coefficients of the wavelet transform can be directly quantized and coded. In order to improve coding efficiency, however, JPEG2000 allows these coefficients to be divided on a bitplane-by-bitplane basis, and allows the individual bitplanes to be ordered with respect to each pixel or each code block.

Figure 5A:
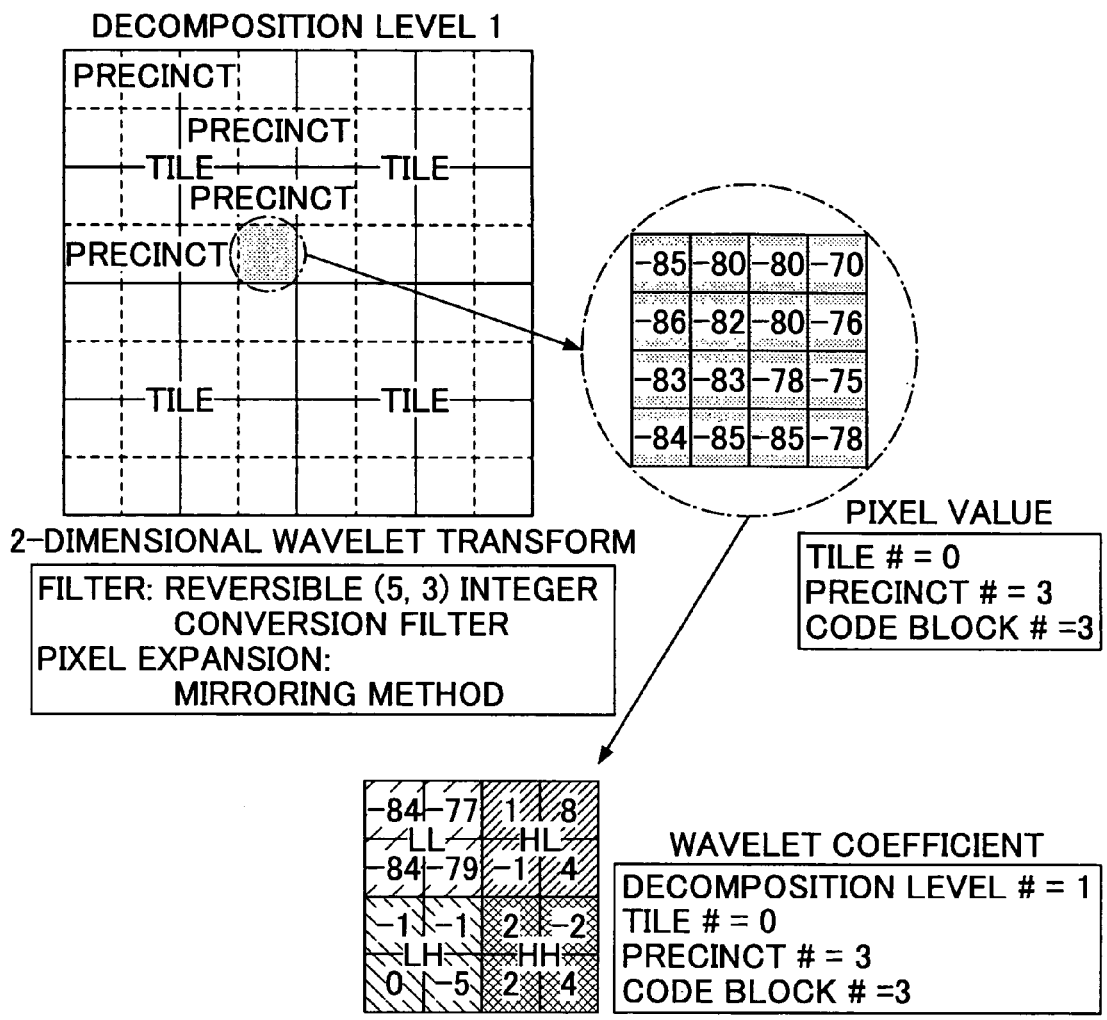

FIGS. 5A through 5E are illustrative drawings for illustrating a procedure for ordering bitplanes. As shown in FIG. 5A, this example is directed to a case in which an original image (32×32 pixels) is divided into four tiles each comprised of 16×16 pixels. The size of a precinct and the size of a code block at the decomposition level 1 are 8×8 pixels and 4×4 pixels, respectively. The sequence numbers of precincts and code blocks are given in a raster order. In this example, precincts are given sequence numbers 0 to 3, and code blocks are given sequence numbers 0 to 3. The mirroring method is used for pixel extension outside the tile boundaries. A reversible (5, 3) filter is used for the wavelet transform, thereby generating wavelet coefficients of the decomposition level 1.

An example of a typical layer structure in the case of tile 0/ precinct 3/ code block 3 is also shown in FIG. 5A through 5E. A code block after transform is divided into sub-bands (1LL, 1HL, 1LH, 1HH), and each sub-band is provided with wavelet coefficients.

The layer structure would be easier to understand if the wavelet coefficients are viewed in a traverse direction (i.e., bitplane direction). A single layer is comprised of a desired number of bitplanes. In this example, layers 0, 1, 2, and 3 are comprised of 1 bitplane, 3 bitplanes, 1 bitplane, and 3 bitplanes, respectively. The closer the bitplane of a layer to the LSB (least significant bit: the lowest-order bit), the earlier the layer is quantized. Layers closer to the MSB (most significant bit: the highest-order bit) remain until all the other layers are qunatized. A method that disposes of layers closer to the LSB first is referred to as truncation, which provides for the diligent control of quantization rates. In this manner, codes are disposed of until a predetermined compression rate is achieved by starting from a state in which no bitplane (or sub-bitplane) is discarded. Such a process is referred to as post quantization, and may be the most significant feature of the JPEG2000 algorithm.

The entropy coding/decoding unit 104 shown in FIG. 1 encodes the tiles 112 of each component 111 by use of likelihood estimation based on the contexts and the current bit. In this manner, coding in the unit of a tile is carried out with respect to all the components 111 of an original image. Finally, the tag processing unit 105 consolidates all the coded data supplied from the entropy coding/decoding unit 104 into a single code sequence of data (i.e., code stream), and attaches tags thereto.

Figure 6:
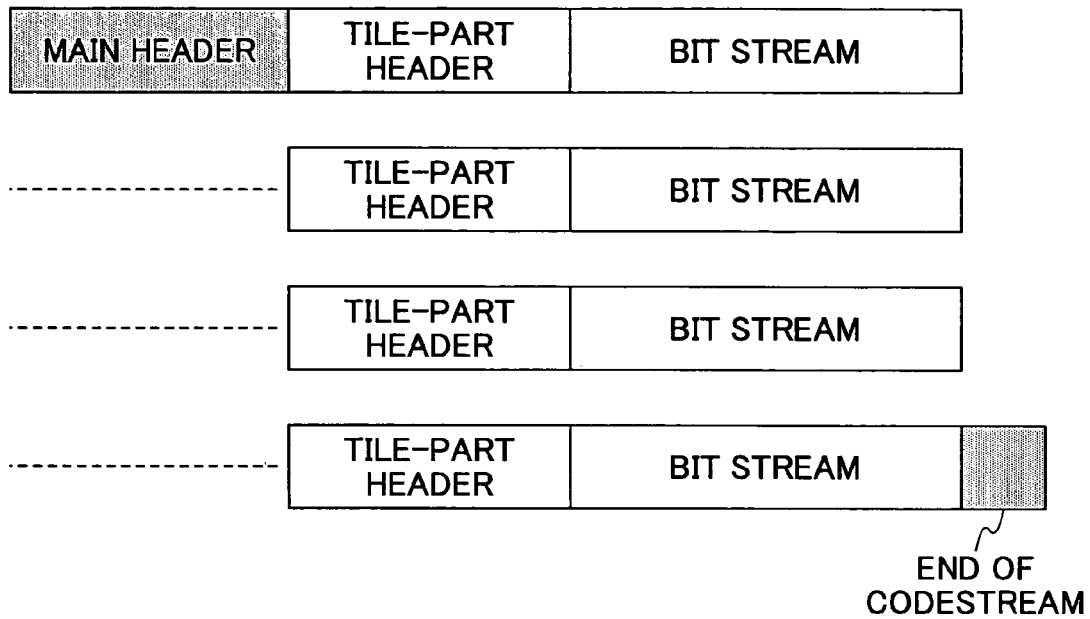
FIG. 6 is an illustrative drawing showing the structure of a frame of code sequence data.

FIG. 6 is an illustrative drawing showing the structure of a frame of code sequence data. Tag information called "header" (Main header) is attached to the beginning of code sequence data, and tag information called "tile-part header" indicative of a tile boundary position, a tile boundary direction, and the like is also attached to the beginning of code data of each tile (i.e., bit stream). The coded data of each tile follows the headers. The main header includes a description of coding parameters and quantization parameters. At the end of the code sequence data is provided another tag (End of codestream).

At the time of decoding, image data is generated from the code sequence data of each tile 112 of each component 111 in a manner reverse to the coding of image data. In this case, the tag processing unit 105 interprets the tag information attached to the code sequence data that is input from the exterior, and decomposes the code sequence data into code sequence data of each tile 112 of each component 111. Decoding (decompression) is performed with respect to each of the code sequence data of each tile 112 of each component 111. The position of a bit that is to be decoded is determined in such order as determined according to the tag information in the code sequence data. The quantization/dequantization unit 103 then generates contexts from the surrounding bits (that have already been decoded) around the selected bit position. The entropy coding/decoding unit 104 generates the selected bit by decoding the code sequence data through likelihood estimation based on the contexts. The generated bit is inserted into the selected bit position.

The data decoded in this manner is provided in a format having divided spaces corresponding to respective frequency bands. The two-dimensional wavelet transform/inverse-transform unit 102 performs the 2-dimensional inverse wavelet transform to restore each tile of each component of the image data. The restored data is converted into image data of the original color system by the color-space conversion/inverse-conversion unit 101.

Image Coding Apparatus and Code Decoding Apparatus

The image coding apparatus and code decoding apparatus of one embodiment are directed to a system that delivers image data (digital contents) from a provider to users by use of a network such as the Internet, for example. In this example, a computer of the provider at a transmission end constitutes an image coding apparatus, and each user's computer at a receiving end constitutes a code decoding apparatus.

Figure 7:
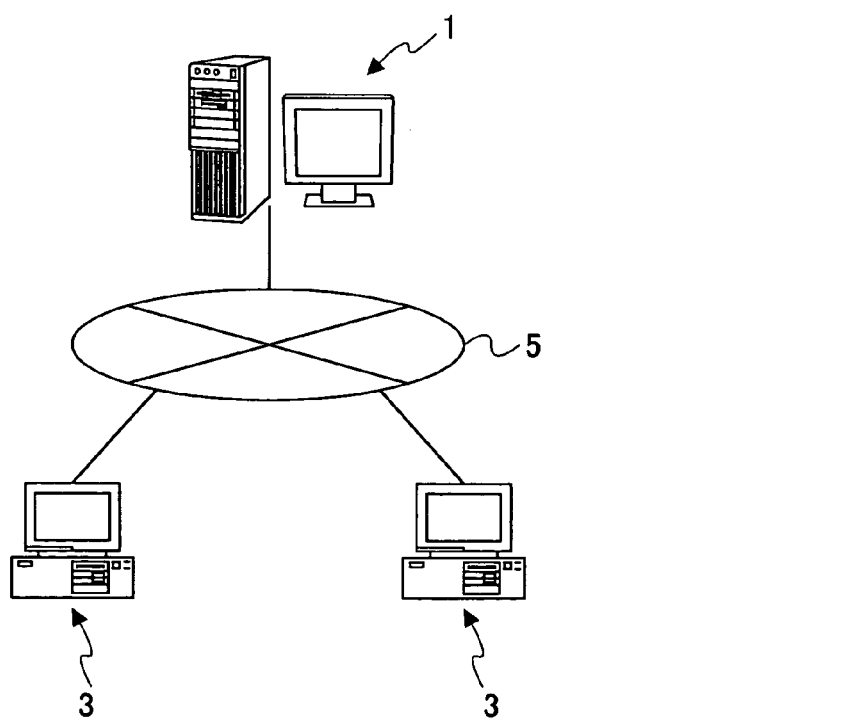
FIG. 7 is a block diagram of a system relevant to the invention.

FIG. 7 is a block diagram of the system as described above. A server computer 1 serving as an image coding apparatus at the provider side is connectable through a network 5 such as the Internet to a personal computer 3, which serves as a code decoding apparatus at each user end.

Figure 8:
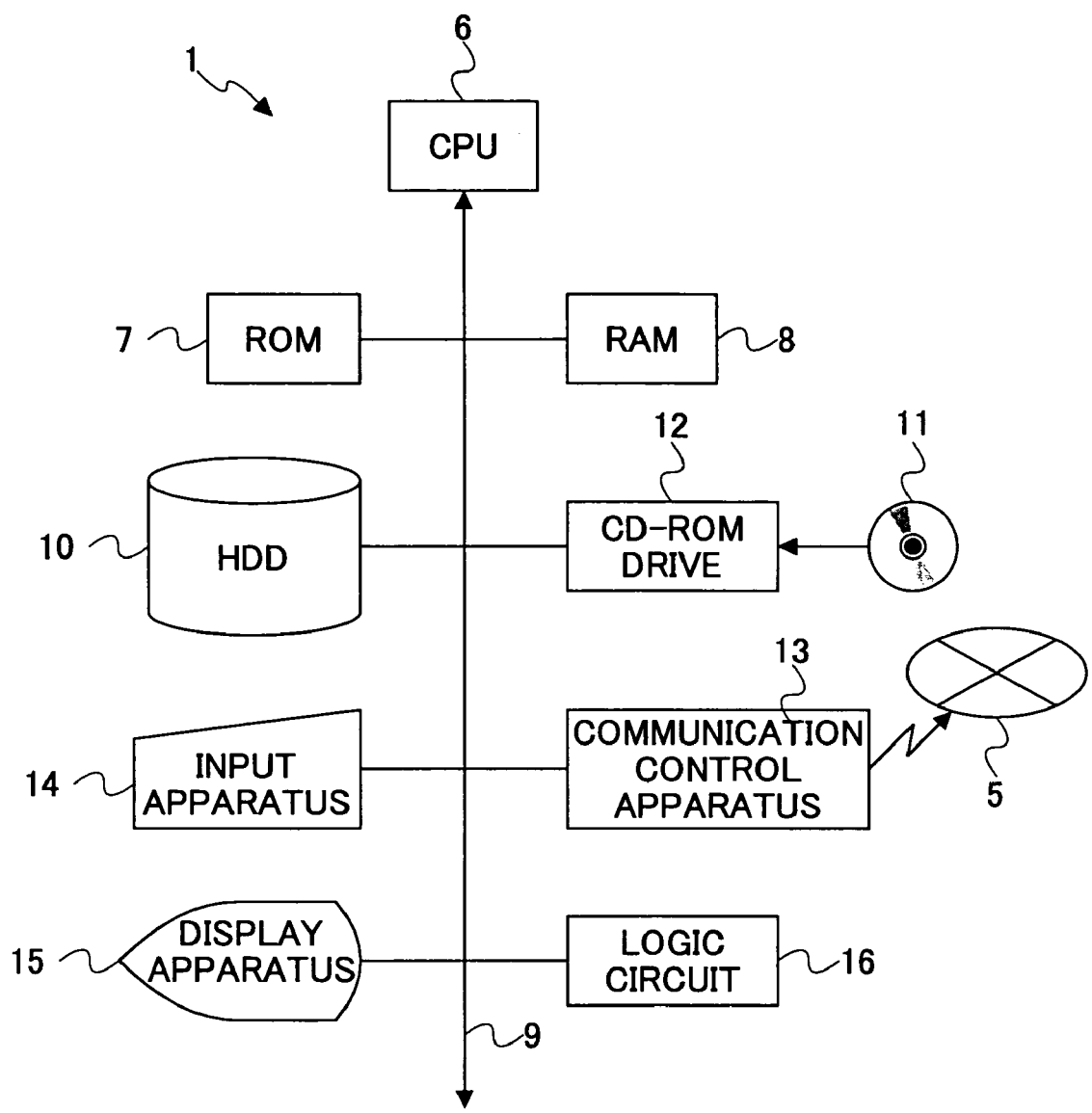
FIG. 8 is a block diagram showing a schematic hardware construction of either one of a server computer and a personal computer shown in FIG. 7.

FIG. 8 is a block diagram showing a schematic hardware construction of either one of the server computer 1 and the personal computer 3. As shown in FIG. 8, the computer 1 or 3 includes a CPU (central processing unit) 6, which is a main portion of the computer and attends to central control of various units. A ROM (read only memory) 7 having BIOS and the like stored therein and a RAM (random access memory) 8 for storing various data are connected to the CPU 6 through a bus 9. The RAM 8 is capable of storing various data in a re-writable manner, and thus serves as a work area for the CPU 6. For example, the RAM 8 functions as an input buffer or the like.

Also connected to the bus 9 are an HDD (hard disk drive) 10, a CD-ROM drive 12 for reading a CD-ROM 11 to serve as a mechanism for reading distributed computer software programs, a communication control apparatus 13 for communicating with the computer 3 or 1 at the other end through the network 5, an input apparatus 14 such as a keyboard and a mouse, and a display apparatus 15 such as a CRT (cathode ray tube) or an LCD (liquid crystal display). Such connections are provided through I/O.

In the case of the personal computer 3, code data that is compression-coded is downloaded from the server computer 1 through the network 5, and is then stored in the HDD 10.

The CD-ROM 11 is a memory medium (record medium) of one embodiment of the invention, and stores therein an OS (operating system) and various kinds of computer software. The CPU 6 reads the computer software stored in the CD-ROM 11 by use of the CD-ROM drive 12 for installment in the HDD 10.

As a record medium, not only the CD-ROM 11 but also an optical disk such as a DVD, a magneto optic disk, a magnetic disk such as an FD, and various other types of media such as a semiconductor memory can as well be used. Further, computer software may be downloaded for installment in the HDD 10 through the network 5 such as the Internet by use of the communication control apparatus 13. In this case, a memory device that stores computer software in the transmission end server also constitutes the record medium of the invention. The computer software may operate on a predetermined OS (operating system), and may use the OS to perform part of operations of various processes. The computer software may also be part of a set of program files that constitute predetermined application software and the OS.

The HDD 10 of the computer 1 or 3 as described above stores an image processing program as one of the computer software programs. This image processing program is part of the invention. The CPU 6 operates based on the image processing program to provide various functions of the computer 1 or 3. One of such functions is the functional blocks of the JPEG2000 algorithm that have been described with reference to FIG. 1. According to the JPEG2000 algorithm as previously described, image data is compression-coded, and code data is decoded. That is, the compression coding function and the decoding function as shown in FIG. 1 are implemented through the CPU 6 that performs relevant processes based on the program stored in the HDD 10. Alternatively, these functions may be implemented through a hardware construction comprised of logic circuits or the like.

Coding of Scrambled Image at Server Computer

According to the JPEG2000 algorithm as previously described, in the process of coding image data, a reversible or irreversible conversion can be performed until the quantization of discrete wavelet coefficients obtained by applying the wavelet transform to input image data. A reversible process such as entropy coding is then applied for generating code sequence data from the quantized discrete wavelet coefficients. In the process of decoding code data, a reversible conversion takes place until the decoding of discrete wavelet coefficient data from input code sequence data (i.e., compressed and stored data) or until the decoding of quantized coefficient data (no quantization is performed in the case of reversible compression). A reversible or irreversible conversion can then be performed when generating image data from the decoded discrete wavelet coefficient data.

The server computer 1 of this embodiment performs compression coding with respect to image data by use of the irreversible mode of the JPEG2000 algorithm, for example, and generates code data while carrying out scrambling as may be necessary at the time of compression coding.

FIG. 9A is a block diagram showing a simplified version of the compression coding unit of the JPEG2000 algorithm that is performed by the server computer 1. This performs an irreversible process at the time of quantizing discrete wavelet transform coefficients. The compression coding unit 26 of FIG. 9A includes an inputting unit 21 for receiving image data to be processed from various types of equipment such as a digital camera, a personal computer, and the like, a two-dimensional wavelet transform unit 22 (corresponding to 102) for performing the two-dimensional wavelet transform after the received image data is subjected to color space conversion and the like, a coefficient quantizing unit 23 (corresponding to 103) for performing irreversible quantization such as post quantization that suppresses a dynamic range in order to achieve efficient compression of discrete wavelet transform coefficients, a lossless compression coding unit 24 (corresponding to 104) for performing lossless compression coding such as the entropy coding (coefficient modeling+arithmetic coding) or the like with respect to the quantized discrete wavelet transform coefficient, and a code data outputting unit 25 (corresponding to 105) for rearranging the encoded code data and thereby outputting the data to appropriate positions.

In addition, a scrambling unit 27 and a reversible digital-watermark embedding unit 28 are provided. The scrambling unit 27 serves as a scrambling unit or a scrambling function for scrambling the data that is to be subjected to lossless compression coding by the compression coding unit 26, i.e., for scrambling the discrete wavelet transform coefficients quantized by the coefficient quantizing unit 23. The reversible digital-watermark embedding unit 28 serves as a digital-watermark embedding unit or digital-watermark embedding function for embedding digital watermark data into the scrambled data where such digital watermark data is necessary for restoring the scrambled data. The scrambling unit 27 functions only when a predetermined password (e.g., a personal identification number comprised of alphanumerals of two or more digits) is entered into the inputting unit 21 together with image data. The entered password is encrypted for use in scrambling. If no password is entered at the time of inputting image data, lossless compression coding is performed without the operation of the scrambling unit 27 and the reversible digital-watermark embedding unit 28. In semi-lossless compression by JPEG2000, the wavelet transform unit 22 and the coefficient quantizing unit 23 provide a normal lossy process. Because of this, the scrambling unit 27 may be provided between the coefficient quantizing unit 23 and the lossless compression coding unit 24. In image compression coding shown in FIG. 9A, the reversible digital-watermark embedding unit 28, the lossless compression coding unit 24, and the outputting unit 25, all of which are situated at stages subsequent to the scrambling unit 27, perform reversible processes. If anyone of these units carries out an irreversible process, descrambling is not possible at the time of image restoration. As shown in FIG. 9B, where an irreversible digital-watermark embedding unit 28' is used, such unit needs to be provided before the scrambling unit 27. It should be noted that both the reversible digital watermark embedding unit 28 and the irreversible digital-watermark embedding unit 28' may be used. In such a case, it suffices to provide these units at the positions as shown in FIG. 9A and FIG. 9B, respectively.

In the following, a process performed by the scrambling unit 27 will be described. The scrambling unit 27 scrambles data through randomizing. That is, the Hash conversion is applied to unscrambled, original data based on an encrypting function such as the Hash function, thereby performing random encryption (randomizing), in order to prohibit the unscrambled original data from being decrypted. The Hash function is unidirectional random-number generator that generates random numbers by using a parameter as a seed, and has features as follows (Kazue Sako, "Fairness Guarantee and Privacy Protection," The Journal of the Institute of Electronics, Information and Communication Engineers, February, 2000):

Feature 1) input values cannot be ascertained from output values;

Feature 2) output values are totally changed in response to a mere one-bit change in the input values; and Feature 3) it is practically impossible to find two different inputs that produce the same output.

The Hash function is a function Y=Hash(X) that generates pseudo random numbers Y having a fixed length by using a given text X. The generated value Y is called a Hash value. Since the value Y can be regarded as a random number obtained from the value X serving as a seed, those who do not know how to calculate the function cannot find the value X by using the value Y. This feature of the Hash function is referred to as a unidirectional function. However, the same value X always produces the same value Y. If an inverse Hash function $X=Hash^{-1}(Y)$ exists, this inverse conversion function produces a value X that is always the same if the same value Y is used. Moreover, it is extremely difficult to create different texts X having the same Hash value Y.

In this manner, the Hash conversion makes it impossible to ascertain original data from generated data. Because of this, the use of the Hash conversion for scrambling data will successfully prevent decryption.

The embedding of digital watermarking by the digital-watermark embedding unit 28 makes it possible to restore original data by use of relevant software and a password at the time of decoding scrambled data. Here, encrypted digital-watermarking data is embedded into the scrambled data of an entire image (i.e., discrete wavelet transform coefficients that are quantized and scrambled), such that differentials (displacements) between the scrambled data and unscrambled data can be restored through randomizing by the Hash function.

In the following, an encryption function used in this embodiment will be described. As an encryption function of this embodiment, the Hash function as follows is employed.

[Data Resulting From Conversion]=[Original Data]* [Generator]%[Modulo: Prime Number] (1)

The above formula multiplies original data by a generator, and obtains a remainder by use of a predetermined prime number as a modulo. The obtained remainder is the data resulting from the conversion. The inverse conversion is as follows.

[Original Data]=(([Data Resulting From Conversion]+[Modulo: Prime Number]*m) l.c.m. [Generator])/[Generator] (2)

The above formula first obtains the lowest common multiple of the data resulting from conversion plus m times the prime number and the generator, and then divides the lowest common multiple by the generator. Here, "A l.c.m. B" represents the lowest common multiple of an integer A and an integer B. In the above formulas (1) and (2), the generator may be replaced by the generator to the n-th power where n is an integer (e.g., the generator squared, the generator cubic).

If original data is 101, a generator 3, and a modulo 127, then, the Hash conversion described above becomes as follows.

Data Resulting From Conversion=101*3% (Modulo: 127)=49

Moreover, the inverse conversion produces the original data from the data resulting from conversion as follows.

Original Data=(([49]+(Modulo: 127)*m)l.c.m.[Generator: 3]/[Generator: 3]=101 (here, l.c.m.=303 because m=2)

By utilizing the Hash function described above, an encryption function Y=Hash (X) of this embodiment is defined as follows.

[x: (decimal number)]:[Y: (8-digit binary number)]

| | |
|---|---|
| 0 | 11111111 |
| 1-126 | data whose first bit is "1" and the 7 | following bits are a binary number obtained by applying the Hash conversion to original data X (1-126),

| | |
|---|---|
| 127 | 10000000 |
| 128 | 01111111 |
| 129-254 | data whose first bit is "0" and the 7 | following bits are a binary number obtained by applying the Hash conversion to original data X (129-254) minus 128,

| 255 | 00000000 |
|---|---|

This encryption function randomizes original data 0-255 into 8-digit binary numbers 00000000-11111111 (or 2-digit hexadecimal numbers), and is able to convert different original data X into different converted data Y.

The example of the above-described encryption function will be shown below.

Data before and after conversion are delimited by the increments of two digits, and are regarded as hexadecimal numbers to which the above-described encryption function is applied.

[Modulo: Prime Number]=127 (decimal)
[Generator]=3
[Original Data]=20010831 (which is regarded as if it is 8-digit hexadecimal number, and is delimited by the increments of two digits to which the encryption function is applied.)
[Case 1 Data Resulting From Conversion]
"$^{-1}$" means "Inverse Conversion"
E0, 83, 98, 94
They are computed by equation (1) whose "Original Data" is 2 figures from "20,01,08,31" as 2 figures hexadecimal.
[Case 2: Data Resulting From Conversion]$^{-1}$
"$^{-1}$" means "Inverse Conversion"
B5, D5, AD, E5
They are computed by equation (2) whose "Data Resulting From Conversion" is 2 figures from "20,01,08,31" as 2 figures hexadecimal.
[After Recovery Conversion]
20,01,08,31 (date (Aug. 31, 2001) is restored)
They are computed by equation (1) whose "Original Data" is 2 figures from "B5, D5, AD, E5" as 2 figures hexadecimal.

In place of the Hash conversion, the public key method such as well-known RSA may be used as a method of encryption (i.e., as an encryption function). Alternatively, shared-key cryptography such as DES and AES may as well be used.

In the following, a description will be given of a method of determining displacements (differentials) of pixel values between before and after encryption with regard to a case in which the encryption function of this embodiment is used to scramble images.

A displacement basis Rk is a basis for computing the displacements of pixel values. Pk designates a direction of displacement.
Rk=Hash("Password," "immediately preceding (k−1)-th processed value") excluding the least significant bit
Pk=−1 if the least significant bit of Hash("password," "immediately preceding (k−1)-th processed value") is ON, and 1 if the least significant bit is OFF Here, the processed value is a result of immediately preceding processing (displacement basis) when pixels (sequence of pixels) are successively processed. In another embodiment, the processed value may be a result of yet earlier processing (e.g., (k−2)-th, (k−3)-th, or the like), or may be a plurality of results of processing (e.g., both (k−1)-th and (k−2)-th).

As described above, the least significant bit of a Hash value of the encryption function is excluded, thereby increasing/decreasing the number of effective digits. This makes it possible to adjust a range in which the displacement basis Rk increases or decreases.

A password is included as a parameter in the encryption function. That is, the encryption function Hash(X) is applied to a value that is determined based on the password and the immediately preceding (k−1)-th processed value. The displacement basis Rk may be used, as it is, as a pixel displacement for randomizing.

Displacement=Rk*Pk

A factor of degree may be incorporated in order to provide a displacement as follows.

Displacement=Rk*(factor of degree)*Pk.

The factor of degree is a factor that is multiplied by the displacement basis Rk. The larger the factor of degree, the larger the displacement is. An increase in the factor of degree brings about an increase in the degree of image scrambling. Conversely, the smaller the factor of degree, the smaller the displacement is. A decrease in the factor of degree brings about reduction in the degree of image scrambling.

Figure 10:
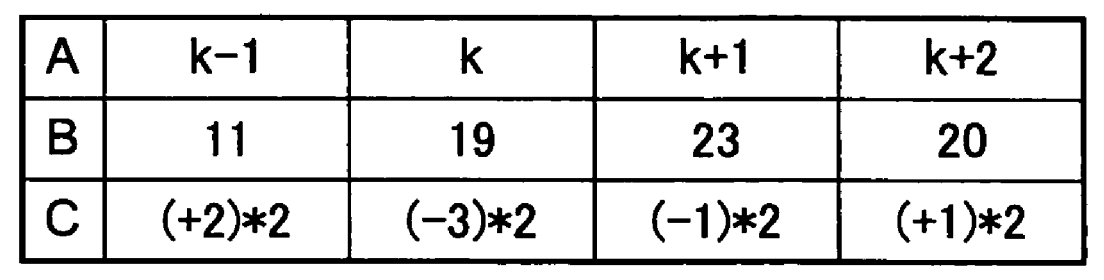

FIG. 10 is a table chart showing an example in which specific numerical values are used. In FIG. 10, a row A shows sequence numbers indicative of processing order. A row B shows original quantized data. A row C demonstrates an increase/decrease (displacement) for scrambling (=(Pk*Rk)*(factor of degree: 2)). With reference to FIG. 10, a description will be given of how to calculate a k-th pixel displacement. As shown in FIG. 10, the pixel value of the (k−1)-th pixel is 11, and the pixel-value displacement of the (k−1)-th pixel is (+2)*2. Thus, Rk and Pk will be as follows.
Rk=Hash("password," (11+2*2)) excluding the least significant bit
Pk=−1 if the least significant bit of Hash ("password," (11+2*2)) is ON, and 1 if the least significant bit is OFF
For the sake of explanation, it is taken for granted that Hash ("password," (11+2*2))=7(decimal)=111 (binary).
Rk=11 (binary)=3(decimal)
Pk=−1 (the least significant bit is ON ("1"))
Thus, the displacement of the k-th pixel is obtained as follows.

Displacement=(−1)*3*(factor of degree: 2)=−6

In this example, the factor of degree is 2. This value may be a fixed value, and may be embedded into an encoded image as a watermark. Alternatively, this value may be input by a user at the time of scrambling and at the time of descrambling. In this embodiment, further, the least significant bit of the value of the encryption function is used as Pk, and the remaining bits after excluding the least significant bit are used as Rk. In another embodiment, Pk may be any bit of choice, or may be determined based on a plurality of bits. Rk may be obtained by excluding the bit(s) used for Pk from the encryption function value, or may be obtained without excluding such bit(s).

In this manner, the discrete wavelet transform coefficients are scrambled, and encrypted digital-watermark data is embedded for use for restoration. Such data (discrete wavelet transform coefficients with embedded watermark data) is subjected to irreversible conversion by the lossless compression coding unit 24. With this provision, the scrambled discrete wavelet transform coefficients with the embedded digital-watermark data are compressed without any loss. The code data is then subjected to tag processing or the like, and is stored in memory such as the HDD 10.

According to the embodiment as described above, even when input image data is subjected to compression coding in the server computer 1 according to the irreversible mode of the JPEG2000 algorithm, the compression coding that is performed after quantization is reversible (lossless). Because of this, even when quantized discrete wavelet transform coefficients are scrambled immediately before the compression coding, such compression takes effect without causing any data loss. Scrambling can thus be decoded in a reversible manner, making it possible to fully remove the effect of scrambling. Further, data for restoring original data from the scrambled data is embedded into the entire image as encrypted digital-watermark data. This makes it practically impossible for unspecified users to remove scrambling, thereby protecting the unscrambled, original data.

When data is randomly encrypted by the scrambling unit 27, it is preferable to save the highest-order coefficients of the discrete wavelet transform coefficients and to perform encryption mainly with respect to lower-order coefficients. The higher the order of coefficients is, the closer to original image data these coefficients are. If such coefficients are randomized, the effect of encryption is too strong, making it impossible to even remotely guess the original image from a scrambled image. If there are only the highest-order coefficients, however, these highest-order coefficients are subjected to random encryption.

More specifically stated, scrambling is performed with respect to significant coefficients of the bit coefficients (discrete wavelet transform coefficients) that are provided in bitplanes by quantization. A significant coefficient of the bit coefficients refers to the coefficient for which a bit coefficient of interest is already known to be non-zero when the discrete wavelet transform coefficients provided in bitplanes for bit representation are encoded from higher-order bits to lower-order bits as described in connection with the JPEG2000 algorithm, for example. In this manner, scrambling is performed with respect to the significant coefficients of the bitplane-form bit coefficients, thereby achieving effective scrambling.

Through scrambling, a bit coefficient of interest may be inverted ("0" to "1" and "1" to "0"), for example. When such bit inversion is used, an adjacent bit (a next higher-order bit and/or a next lower-order bit) may also be inverted, preferably. That is, if inversion from "0" to "1" is performed, "1" is inverted to "0." If inversion from "1" to "0" is performed, "0" is inverted to "1." When scrambling inverts a bit coefficient of interest, the portion of a displayed image where the bit inversion is performed may exhibit an extreme change in brightness, causing undesirable degradation in image quality. In consideration of this, provision as described above is made to reduce and alleviate such undesirable effect on image quality. Further, since excessive scrambling makes an original image indiscernible, only an adjacent bit located at the next lower order may be inverted in such a case.

In the scrambling of quantized data (discrete wavelet transform coefficients) by the scrambling unit 27, it is possible to adjust the scrambling level (i.e., the level of image quality degradation) by utilizing the features of JPEG2000. The scrambling level is determined in accordance with the purpose and needs of image data provided by the provider, thereby providing a scrambled image having an appropriate degree of image-quality degradation. FIG. 11 is a drawing showing different degrees of scrambling that are effected by changes in the factor of degree. Compared with an original image, scrambled images are disturbed. As can be seen, the degree of disturbance varies depending on the degree of scrambling, i.e., on the size of the factor of degree. Since scrambling is a reversible conversion, the removal of scrambling (descrambling) makes it possible to restore the complete original image.

As an example of an adjustable scramble level, bitplane processing shown in FIGS. 5A through 5E may be utilized in the JPEG2000 algorithm. According to the JPEG2000 algorithm, a sub-band function or the like may be used in order to achieve easy provision of thumbnail images at the time of browsing image data. If the data of higher-order bits is randomized for scrambling in the bitplane bit coefficients, the shape of image features is distorted without changing image resolution. This achieves blurring scrambling effects, which successfully causes image degradation in thumbnail images. In this manner, the selection of bit positions in the bitplane bit coefficients provides for an adjustable scramble level.

As another example of an adjustable scramble level, a sub-band structure may be used in the discrete wavelet transform of the JPEG2000 algorithm. According to the JPEG2000 algorithm, image resolution has a sub-band hierarchical structure as shown in FIGS. 3A through 3D. The lower-level sub-band LL (3LL, 2LL, 1LL, etc.) are the portions of higher image resolution. If data of the lower-level sub-band portions are scrambled through randomizing, finer scrambling is successfully achieved, which does not cause much image degradation in the thumbnail images. In this manner, the selection of hierarchical positions in the sub-band structure of the discrete wavelet transform provides for an adjustable scramble level.

As another example of an adjustable scrambling level, the unit of processing in the JPEG2000 algorithm may be used. According to the JPEG2000 algorithm, processing may be performed not with respect to an entire image at once but in units of rectangular regions (tiles), which constitute a unit of processing. For example, if the size of a block that defines an area for random scrambling is enlarged, a resulting scrambled image becomes increasingly disorganized. This achieves scrambling that makes the feature of an original image (entire image) less discernible, which successfully causes image degradation in thumbnail images. In this manner, the selection of the size of a block for scrambling provides for an adjustable scrambling level.

Scrambling Coding and Decoding by Personal Computer

The personal computer 3 of one embodiment receives code data distributed by the server computer 1, and decodes the code data according to the irreversible mode of the JPEG2000 algorithm. If the user is authorized by the provider to browse data, the user has software distributed by the provider where this software contains a password for descrambling at the time of decoding. At the time of decoding, the password is entered to decipher digital-watermark data, thereby descrambling to restore original image data.

FIG. 12 is a block diagram showing a simplified version of the decoding unit of the JPEG2000 algorithm that is performed by the personal computer 3. The decoding unit 34 of FIG. 12 includes an inputting unit 31 serving as a code data inputting unit or a code data inputting function for receiving code data inputs that are scrambled and distributed through the network 2 by the server computer 1, a decoding unit 32 for decoding the input code data through the decoding of lossless compression codes such as entropy decoding or the like, and a two-dimensional inverse wavelet transform unit 33 (corresponding to 103, 102, 101, etc.) for restoring original image data through the two-dimensional inverse wavelet transform.

Further provided between the decoding unit 32 and the two-dimensional inverse wavelet transform unit 33 are a reversible digital-watermark deciphering unit 35 for decoding digital-watermark data embedded into the code data and a descrambling unit 36 serving as a descrambling unit or a descrambling function for removing scrambling from the code data based on the decoded digital-watermark data. The digital-watermark deciphering unit 35 and the descrambling unit 36 operate only when a predetermined password is entered into the inputting unit 31 together with the code data. Based on the entered password, the digital-watermark deciphering unit 35 decodes the digital watermark data embedded into the code data. The descrambling unit 36 then removes scrambling from the code data based on the differential data or the like contained in the decoded digital watermark data. If decoding is performed by software employing the general JPEG2000 algorithm without special software provided by the provider according to browsing authorization, distributed code data that has been scrambled and includes predetermined digital-watermark data cannot be decoded and descrambled. Thus, an attempt to restore original data from the scrambled code data fails.

In the following, a specific example will be given with regard to how to determine the restoring value in the personal computer 3 at the time of decoding. This corresponds to a method of determining a displacement (differential) relative to original data that is added at the time of scrambling using the Hash conversion.

The following notations are used.

Rk=Hash("password," "immediately preceding (k−1)-th quantized data value prior to restoration") excluding the least significant bit Pk=−1 if the least significant bit of Hash ("password," "(k−1)-th quantized data value prior to restoration") is ON, and 1 if the least significant bit is OFF Here, the quantized data value prior to restoration that appears in the above formulas is the quantized data value that is immediately preceding in the pixel sequence for successive processing, and that is not yet subjected to restoration (i.e., displaced quantized data). Then, the restoring value is represented as follows.

(Restoring Value)=−(Displacement)=Rk*(factor of degree)*Pk*(−1)

Specific numerical values will be used as an example in the following. When the quantized data sequence is as shown in FIG. 10, Rk=3 (excluding the least significant bit), and Pk=−1 (the least significant bit is ON) as in the previous description about the determining of a displacement. In this case, the restoring value is as follows.

(Restoring Value)=−(Displacement)=3*(factor of degree: 2)*(−1)*(−1)=+6

Modification

Figure 13A:
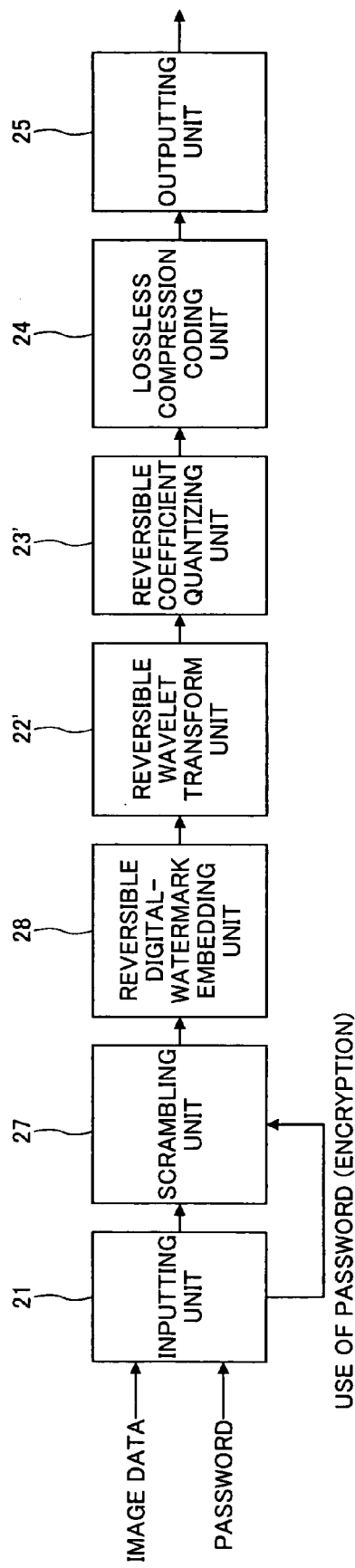
FIGS. 13A and 13B are block diagrams showing variations of the compression coding unit of the JPEG2000 algorithm that is performed by the server computer.

In the example shown in FIG. 9A, the server computer 1 performs compression coding with respect to image data according to the irreversible mode of the JPEG2000 algorithm. If the compression coding is carried out by the reversible mode of the JPEG2000 algorithm, the scrambling unit 27 and the reversible digital-watermark embedding unit 28 are provided prior to the two-dimensional wavelet transform unit 22 as shown in FIG. 13A. Provision is thus made to scramble image data and embed digital-watermark data before the discrete wavelet transform. Here, the reversible wavelet transform unit 22' and the reversible coefficient quantizing unit 23' correspond to the wavelet transform unit 22 and the coefficient quantizing unit 23 of FIG. 9A, respectively.

Figure 13B:
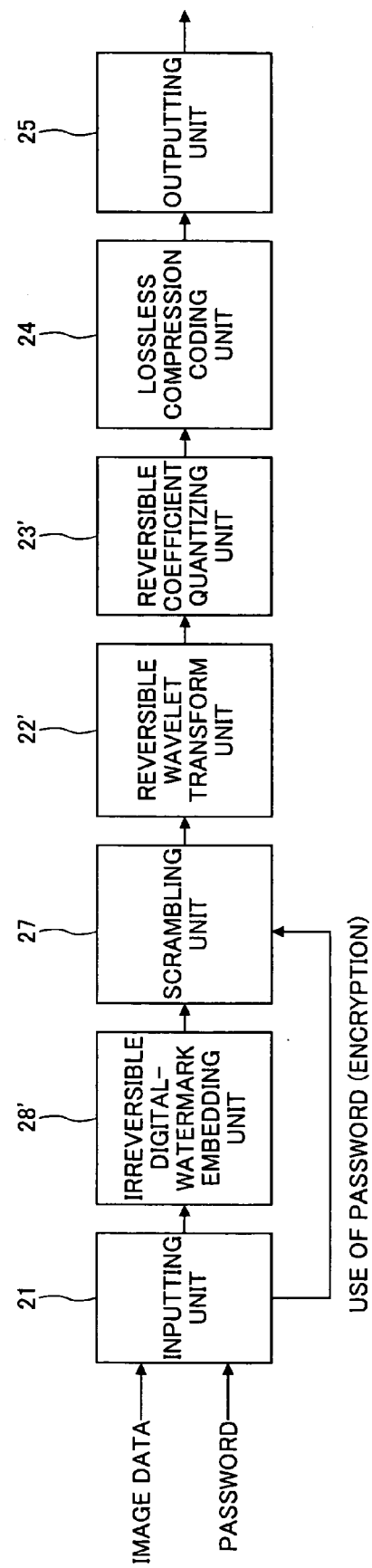

Namely, when input image data is subjected to compression coding according to the reversible mode of the JPEG2000 algorithm, image data prior to the discrete wavelet transform can be completely restored in a reversible manner. Because of this, reversible, complete decoding is achievable even if such image data is scrambled and provided with embedded digital-watermark data. As shown in FIG. 13B, the irreversible digital-watermark embedding unit 28' may be used. In such a case, the irreversible digital-watermark embedding unit 28' is provided prior to the scrambling unit 27 (e.g., between the inputting unit 21 and the scrambling unit 27).

Further, the present invention is not limited to these embodiments, but various variations and modifications may be made without departing from the scope of the present invention.

The present application is based on Japanese priority applications No. 2003-013591, filed on Jan. 22, 2003 and 2004-012239, filed on Jan. 20, 2004, with the Japanese Patent Office, the entire contents of which are hereby incorporated by reference.

What is claimed is:

1. An apparatus for coding an image while scrambling the image by randomizing pixel values, comprising a scrambling unit to scramble an image by utilizing an encryption function to compute a displacement of a pixel value to be randomized in response to a displacement of a previously randomized pixel value.

2. The apparatus as claimed in claim 1, wherein the scrambling unit adjusts the displacement of the pixel value to be randomized according to how many effective bits are present in a value of the encryption function.

3. The apparatus as claimed in claim 1, wherein the scrambling unit adjusts the displacement of the pixel value to be randomized according to a factor of degree.

4. The apparatus as claimed in claim 1, wherein the scrambling unit computes the displacement of the pixel value to be randomized in response to a password as well as the displacement of the previously randomized pixel value.

5. The apparatus as claimed in claim 1, further comprising a compression coding unit to generate a code sequence by performing compression coding with respect to the image, and includes a plurality of functional stages, wherein the scrambling unit is provided at a predetermined stage along a series of the plurality of functional stages, each stage of the plurality of functional stages following the predetermined stage being reversible.

6. The apparatus as claimed in claim 5, wherein the compression coding unit performs the compression coding with respect to the image according to JPEG2000.

7. The apparatus as claimed in claim 6, wherein the compression coding unit performs the compression coding with respect to the image according to an irreversible mode of JPEG2000, and wherein the scrambling unit is situated after a stage for coefficient quantization and randomizes a quantized discrete wavelet transform.

8. The apparatus as claimed in claim 7, wherein the scrambling unit scrambles the image with respect to significant coefficients of bit coefficients that are discrete wavelet transform coefficients quantized into bitplanes.

9. The apparatus as claimed in claim 8, wherein the scrambling unit inverts a bit coefficient for the scrambling, and, together therewith, inverts an adjacent-order bit coefficient.

10. The apparatus as claimed in claim 5, further comprising a digital-watermark embedding unit to embed, into the code sequence, information about the scrambling and the compression coding of the image as digital watermarking.

11. The apparatus as claimed in claim 6, wherein the compression coding unit performs the compression coding with respect to the image according to a reversible mode of JPEG2000, and wherein the scrambling unit is situated prior to a stage for discrete wavelet transform for randomizing of the pixel value.

12. The apparatus as claimed in claim 8, wherein the scrambling unit is capable of adjusting a scrambling level with respect to the quantized discrete wavelet transform coefficients.

13. The apparatus as claimed in claim 12, wherein the scrambling unit is capable of adjusting the scrambling level in accordance with selection of a bit position of the bit coefficients that are the discrete wavelet transform coefficients quantized into bitplanes.

14. The apparatus as claimed in claim 12, wherein the scrambling unit is capable of adjusting the scrambling level in accordance with selection of a hierarchical level of sub-bands generated by discrete wavelet transform.

15. The apparatus as claimed in claim 12, wherein the scrambling unit is capable of adjusting the scrambling level in accordance with selection of size of a block for which the scrambling is performed when a plurality of rectangular areas are provided as units of processing of discrete wavelet transform.

16. A method of scrambling an image by randomizing pixel values, comprising scrambling an image by utilizing an encryption size of a block for which the scrambling is performed when a plurality of rectangular areas are provided as processing units of a discrete wavelet transform.

17. A method of decoding codes, comprising:
decoding scrambled code data into an image, wherein decoding the scrambled code data is performed in a plurality of stages, the scrambled code data being scrambled by the method of claim 16; and
descrambling the scrambled code data, wherein descrambling the scrambled code data is performed at a predetermined stage along a series of the stages.

18. A method of scrambling an image by randomizing pixel values, comprising scrambling an image by utilizing an encryption function to compute a displacement of a pixel value to be randomized in response to a displacement of a previously randomized pixel value.

19. An article of manufacture comprising one or more recordable media having instructions stored thereon which, when executed by a computer, cause the computer to perform a method for decoding codes, the method comprising:
decoding scrambled code data into an image according to JPEG2000, using a plurality of functional stages, the scrambled code data being scrambled by the method of claim 18; and
descrambling the scrambled code data.

20. An article of manufacture comprising one or more recordable media having instructions stored thereon which, when executed by a computer, cause the computer to perform a method for scrambling an image by randomizing pixel values by utilizing an encryption function to compute a displacement of a pixel value to be randomized in response to a displacement of a previously randomized pixel value.

21. The article of manufacture as claimed in claim 20, wherein scrambling the image comprises adjusting the displacement of the pixel value to be randomized according to how many effective bits are present in a value of the encryption function.

22. The article of manufacture as claimed in claim 20, wherein scrambling the image comprises adjusting the displacement of the pixel value to be randomized according to a factor of degree.

23. The article of manufacture as claimed in claim 20, wherein scrambling the image comprises computing the displacement of the pixel value to be randomized in response to a password as well as the displacement of the previously randomized pixel value.

24. The article of manufacture as claimed in claim 20, wherein the method further comprises generating a code sequence by performing compression coding with respect to the image using a plurality of functional stages, wherein scrambling the image is performed at a predetermined stage along a series of the functional stages, each stage of the functional stages following the predetermined stage being reversible.

25. The article of manufacture as claimed in claim 24, wherein generating the code sequence is performed according to JPEG2000.

26. The article of manufacture as claimed in claim 25, wherein generating the code sequence is performed according to an irreversible mode of JPEG2000, and wherein the scrambling unit is performed after a stage for coefficient quantization, and randomizes a quantized discrete wavelet transform coefficient.

27. The article of manufacture as claimed in claim 24, wherein the method further comprises embedding into the code sequence information about the scrambling and the compression coding of the image as digital watermarking.

28. The article of manufacture as claimed in claim 25, wherein generating the code sequence is performed according to a reversible mode of JPEG2000, and wherein scrambling the image is performed prior to a stage for a discrete wavelet transform for randomizing of the pixel value.

29. The article of manufacture as claimed in claim 20, wherein scrambling the image comprises computing the displacement of the pixel value to be randomized in response to a displacement of an immediately preceding randomized pixel value.

30. The apparatus as claimed in claim 1, wherein the scrambling unit computes the displacement of the pixel value to be randomized in response to a displacement of an immediately preceding randomized pixel value.

31. An apparatus for decoding codes, comprising:
a decoding unit to decode scrambled code data into an image, and includes a plurality of functional stages, the scrambled code data being scrambled by the apparatus of claim 1; and
a descrambling unit, provided at a predetermined stage along a series of the functional stages, and to descramble the scrambled code data.

32. An apparatus for decoding codes, comprising:
a decoding unit to decode scrambled code data into an image, and includes a plurality of functional stages, the scrambled code data being scrambled by the apparatus of claim 1; and
a descrambling unit, provided at a predetermined stage along a series of the functional stages, to descramble the scrambled code data.

* * * * *